May 31, 1938. B. D. BEDFORD ET AL 2,119,377
ELECTRIC POWER TRANSMISSION SYSTEM
Original Filed Aug. 20, 1936
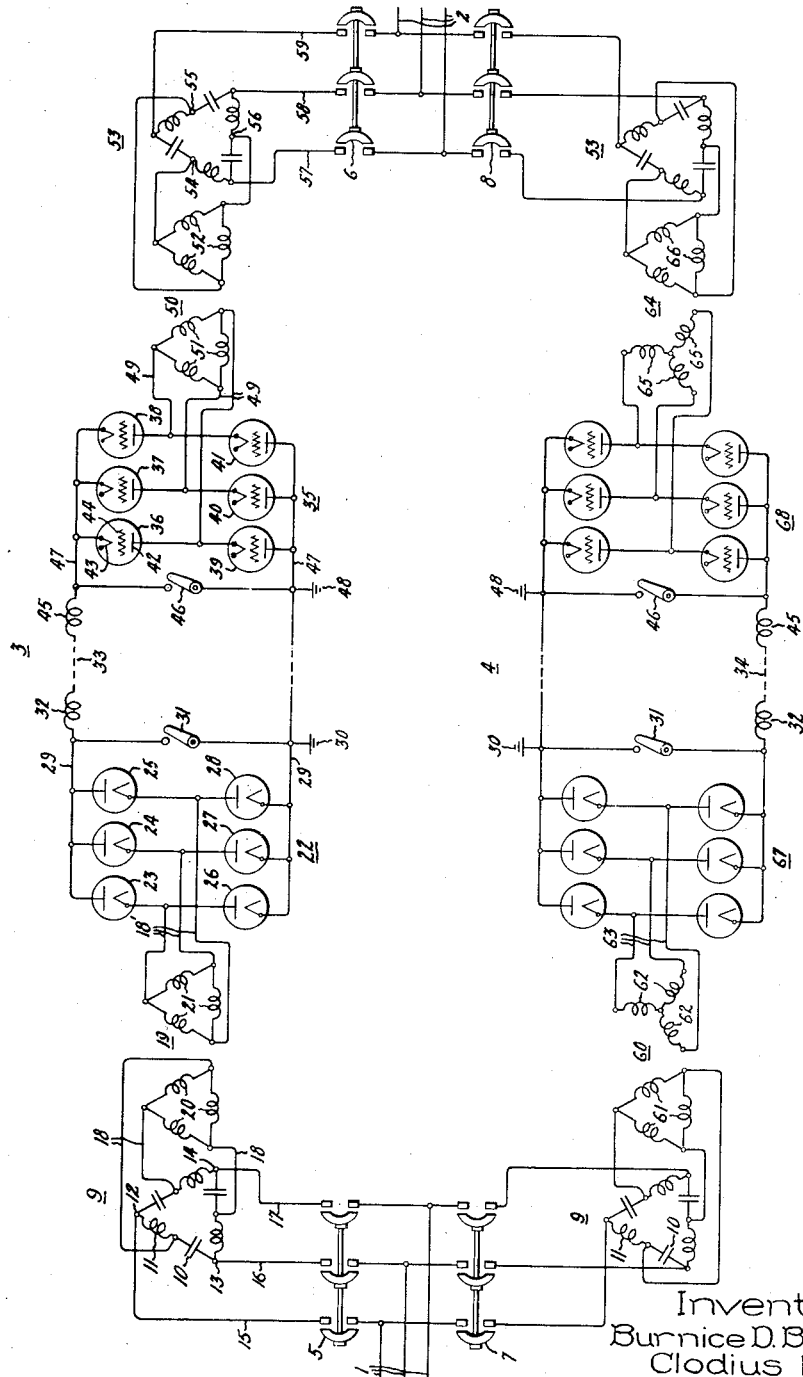
Inventors:
Burnice D. Bedford,
Clodius H. Willis,
Frank R. Elder,
by Harry E. Dunham
Their Attorney.

Patented May 31, 1938

2,119,377

UNITED STATES PATENT OFFICE 2,119,377

ELECTRIC POWER TRANSMISSION SYSTEM

Burnice D. Bedford, Schenectady, N. Y., Clodius H. Willis, Princeton, N. J., and Frank R. Elder, Schenectady, N. Y., assignors to General Electric Company, a corporation of New York Application August 20, 1936, Serial No. 97,012
Renewed November 4, 1937

6 Claims. (Cl. 171—97)

Our invention relates to electric transmission systems and more particularly to electric valve circuits for transmitting electrical energy by high voltage constant current direct current.

While the broad aspects of our invention are generally applicable for use in connection with electric power transmission systems, it is particularly applicable for use in high voltage direct current power transmission systems of the type described and claimed in U. S. Letters Patent 1,990,758, granted February 12, 1935 on an application of Charles W. Stone and assigned to the assignee of the present application. Briefly described, the system as disclosed in the Stone patent comprises a source of energy of constant voltage alternating current which is transformed to alternating current of constant value and then rectified by an alternating current rectifier for transmission at high voltage direct current. The constant direct current is transmitted over a transmission circuit to a receiving circuit, which includes an electric valve inverter for changing the transmitted energy to alternating current of constant value which is transformed to alternating current of constant voltage for distribution purposes or for connection with another constant voltage alternating current system. The electric valve converting circuits may employ networks of the monocyclic type for transforming alternating current from constant voltage to constant current, or vice versa. These networks comprise reactances of opposite sign such as inductive reactances and capacitive reactances.

An object of our invention is to provide a new and improved electric power transmission system.

Another object of our invention is to provide a new and improved electric power transmission system for transmitting electrical energy by means of constant current direct current, and by means of which the electrical operating characteristics of the system are materially improved over the systems used heretofore.

In accordance with the illustrated embodiment of our invention, we provide a new electric power transmission system of the high voltage constant current direct current type for transmitting energy between constant voltage alternating current circuits and direct current circuits, or for transmitting electrical energy between constant voltage alternating current circuits. Means for transforming constant voltage alternating current to alternating current of constant value, such as monocyclic networks employing a plurality of branches of serially-connected reactances of opposite sign, are employed to energize electric valve converting means which rectify the constant current alternating current to obtain direct current of constant value. In order to provide improved operating characteristics and improvement in wave form of the constant current direct current, we provide a plurality of circuits connected in parallel relation and having predetermined phase displacements between the currents of the respective phases of the constant current alternating current circuits. Suitable transforming means are interposed between the means for transforming constant voltage alternating current to constant current alternating current and the electric valve converting means to obtain the predetermined phase displacements in the currents of the respective phases of the constant current circuits. The output circuits of the electric valve rectifying means associated with each of the parallel circuits are connected in series relation to obtain high voltage for electric power transmission purposes. At the receiving end of the electric transmission system a plurality of parallel paths are provided to effect transformation of the constant current direct current to constant voltage alternating current. Electric valve means are employed in each of the parallel circuits for inverting direct current of constant value to alternating current of constant value, and other suitable means, such as monocyclic networks, are used to transform the constant current alternating current to alternating current of constant voltage. The electric valve inverting means in the various parallel circuits are connected in series relation relative to each other and are connected across the high voltage direct current power transmission system.

For a better understanding of our invention, reference may be had to the following description taken in connection with the accompanying drawing and its scope will be pointed out in the appended claims.

The single figure of the accompanying drawing diagrammatically illustrates an embodiment of our invention as applied to an electric power transmission system for transmitting electrical energy between two constant voltage alternating current circuits. The electric power transmission system diagrammatically shown therein is arranged for transmitting electrical energy from a three phase constant voltage alternating current circuit 1 to a three phase constant voltage alternating current circuit 2 through two parallel circuits 3 and 4. The circuit 3 is connected to the alternating current circuits 1 and 2 through any suitable switching means 5 and 6, respectively, and the circuit 4 is connected to the alternating current circuits 1 and 2 through suitable switching means 7 and 8, respectively. Considering in particular the electric circuit 3, we employ any suitable means, such as a monocyclic network 9, to transform constant voltage alternating current to alternating current of constant value. The monocyclic network 9 comprises a plurality of branches of serially-connected reactances of opposite sign, such as the capacitances 10 and the inductances 11, arranged to form a closed circuit. Alternate junctures of reactances of opposite sign 12, 13 and 14 are connected to phase conductors 15, 16 and 17, respectively, of the constant voltage alternating current circuit 1. A constant current alternating current circuit 18 is connected to the other common junctures of reactances of opposite sign in the monocyclic network 9 and effect energization of a transformer 19 having delta-connected primary windings 20 and delta-connected secondary windings 21.

Electric valve converting means 22 comprising electric valves 23–28, inclusive, preferably of the type employing ionizable mediums such as gases or vapors, are connected to the secondary windings 21 of transformer 19 through the constant current circuit 18' and convert the constant current alternating current to direct current of constant value. The electric valves 23–28, inclusive, have been shown as of the type employing only an anode and a cathode. However, it will be understood that if it is desired to transmit energy in either direction between the constant voltage alternating current circuits 1 and 2, the electric valves 23–28, inclusive, may be replaced by electric valves having control members so that the electric valve means 22 may operate as an electric valve inverter to invert constant current direct current to constant current alternating current. The positive terminal of the output circuit 29 of the electric valve inverting means 22 may be connected to ground or to a point of reference potential through any suitable connection 30, and the output circuit 29 may be provided with any suitable switching means 31 to effect a short circuit thereof in order to control the voltages existing in the circuit 3 of the electric valve transmission system. An inductive reactance 32, preferably having an air core, is connected in series relation with the electric valve means 22 and serves as a smoothing reactor for the direct current supplied by the electric valve means 22. A high voltage constant current direct current transmission circuit in the particular arrangement shown comprising two conductors 33 and 34, is employed to transmit electrical energy from the sending end of the transmission system to the receiving end. At the receiving end an electric valve converting means 35, including electric valves 36–41 inclusive, preferably of the type employing ionizable mediums such as gases or vapors, invert the constant current direct current to alternating current of constant value. Each of the electric valves 36–41 comprises an anode 42, a cathode 43 and a control member 44. The electric valves 36–41 are rendered conductive for predetermined intervals and in a predetermined order by control or excitation circuits, not shown. It will be understood that any of the conventional arrangements may be employed to effect this sequential operation of the various electric valves in the electric valve converting means 35. We have found that the control or excitation circuit described and claimed in a copending application for United States Letters Patent of Burnice D. Bedford, Serial No. 88,825, filed July 3, 1936, has proved very satisfactory for this purpose. An inductive reactance 45, preferably having an air core, is connected in series relation with the electric valve converting means 35 and serves as a current smoothing reactor. A suitable switch 46 may be connected to effect short circuit of the direct current circuit including conductors 33 and 34 or to effect short circuit of the input circuit 47 of the electric valve converting means 35. One terminal of the electric valve converting means 35 is also grounded to any suitable connection 48.

A constant current alternating current circuit 49 is energized by the electric valve converting means 35 and effects energization of a transformer 50 having a delta-connected primary windings 51 and delta-connected secondary winding 52. Transformation from constant current alternating current to constant voltage alternating current may be obtained by any suitable means such as the monocyclic network 53 similar to the monocyclic network 9. The alternate junctures of reactances of opposite sign 54, 55 and 56 are energized from the constant current alternating current circuit 49 through the secondary windings 52 of transformer 50, and the other common junctures of reactances of opposite sign of the monocyclic network 53 are connected to phase conductors 57, 58 and 59 of constant voltage alternating current circuit 2 through the switching means 6.

Referring now to the circuit 4, the arrangement of the elements of circuit 4 is substantially the same as that of the elements in the circuit 3, with the exception of a transformer 60 which has delta-connected primary windings 61 and Y-connected secondary windings 62. This arrangement of windings effects a 60 electrical degree displacement between the currents of the respective phases of the constant current alternating current circuit 18 of circuit 3 and a constant current alternating current circuit 63 of circuit 4. In a similar manner, at the receiving end of the electric power transmission system a transformer 64 having Y-connected primary windings 65 and delta-connected secondary windings 66 is employed to effect energization of the associated monocyclic network so that the resultant alternating current voltages obtained are in phase with the alternating voltages of constant value provided by circuits 2 and 3. An electric valve converting means 67 is energized from the constant current alternating current circuit 63 and converts constant current alternating current to constant current direct current to effect energization of the constant current direct current circuit including conductors 33 and 34. The electric valve converting means 68 connected in the circuit 4 inverts constant current direct current to alternating current of constant value and effects energization of the transformer 64. Otherwise, the circuit 4 is arranged in substantially the same manner as the circuit 3 and corresponding elements have been assigned like reference numerals.

The operation of the embodiment of our invention diagrammatically illustrated in the single figure of the accompanying drawing will be explained by considering the system when electrical energy is being transmitted from the constant voltage alternating current circuit 1 to the constant voltage alternating current circuit 2.

Let it be assumed that the circuit interrupters 5, 6, 7 and 8 are in the closed positions and let it be assumed that the circuits are arranged so that circuits 3 and 4 each transmit a predetermined portion of the total power to be transmitted. By virtue of the connections of the secondary windings 21 and 62 of transformers 19 and 60, respectively, the currents of the respective phases of the constant current alternating current circuits 18' and 63 will be displaced substantially 60 electrical degrees so that the electric valve means 22 of the circuit 3 and the electric valve means 67 of circuit 4 operate as two three-phase full wave rectifiers displaced in operation by substantially 60 electrical degrees. It will be understood that the variation in the value of the direct current, or in other words the ripple, will be decreased to that corresponding to the output wave form of a twelve-phase rectifier. This decrease in ripple is of importance since it materially reduces the interference with communication systems. A further feature to be noted is the series connection of the output circuits of the electric valve converting means 22 and 67, whereby there is effected a very desirable increase in the operating voltage of the constant current direct current circuit resulting in improved operating characteristics and economy of apparatus. Electric valve means 35 and 68 function as inverters operating 60 electrical degrees out of phase to supply alternating current of constant value to the transformers 50 and 64 respectively. By virtue of the delta-connection of primary windings 51 of transformer 50 and the Y-connection of primary windings 65 of transformer 64, the respective phase conductor currents supplied to the monocyclic networks 53 will be substantially in phase so that the output voltages of the monocyclic networks 53 will be in phase with each other and in phase with the voltage of the constant voltage circuit 2.

A further important feature of the transformers 19, 50, 60 and 64, is the suppression of the third harmonic components of current, and multiples thereof, which appear in the currents conducted by the electric valve means. Since the wave form of the currents conducted by the electric valves will be substantially rectangular, the wave form of the currents in the constant current circuits will not be sinusoidal. The delta-connected windings of transformers 19 and 50 and the delta-connected windings 61 and 66 of transformers 60 and 64, respectively, serve to suppress the third harmonic components of current, and multiples thereof, so that the current wave distortion will not materially affect the constant voltage alternating current circuits 1 and 2.

Although we have chosen to illustrate our invention as comprising two constant current alternating current circuits operating in parallel for effecting energization of a single direct current circuit, it should be understood that our invention in its broader aspects may be applied to systems of this type generally where it is desired to effect energization of a high voltage constant current direct current transmission circuit through a plurality of constant current alternating current circuits. For the particular applications which may be encountered, it should be further understood that the output circuits of the electric valve converting means, corresponding to electric valve means 22 and 67, may be connected in a number of ways, for example in series or in parallel, to satisfy the peculiar requirements of a particular application.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a constant voltage alternating current circuit, a constant current direct current circuit, and a plurality of circuits for conjointly energizing said direct current circuit each comprising means for transforming constant voltage alternating current to alternating current of constant value, a constant current alternating current circuit, means for effecting a predetermined electrical phase displacement between the currents of said constant current alternating current circuit relative to the currents of the respective phases of the constant current alternating current circuits in the other circuits of said plurality of circuits and electric valve means interposed between said constant current alternating current circuit and said direct current circuit for transmitting energy therebetween.

2. In combination, a constant voltage alternating current circuit, a constant current direct current circuit, and a plurality of electric circuits for conjointly energizing said direct current circuit each comprising a monocyclic network for transforming constant voltage alternating current to alternating current of constant value, a constant current alternating current circuit energized from said network, means connected in said constant current alternating current circuit for effecting a predetermined phase displacement between the currents of the phases of the constant current circuit relative to the respective phase currents in the constant current circuits of the other of said plurality of circuits and electric valve means interposed between said constant current alternating current circuit and said direct current circuit for transmitting energy therebetween.

3. In combination, a constant voltage alternating current circuit, a constant current direct current circuit, and a plurality of circuits for conjointly energizing said direct current circuit, each of said plurality of circuits comprising means for transforming constant voltage alternating current to alternating current of constant value and electric valve means for transmitting energy between said first mentioned means and said direct current circuit, said electric valve means in each of said plurality of circuits being connected in series relation to each other and in series relative to the direct current circuit.

4. In combination, a three-phase constant voltage alternating current circuit, a constant current direct current circuit, and two circuits interposed between said constant voltage circuit and said direct current circuit each including a constant current alternating current circuit and a monocyclic network for transmitting energy between said constant voltage circuit and the associated constant current alternating current circuit, one of said two circuits comprising a transformer connected to said monocylclic network and having delta-connected secondary windings connected to an electric value means for transmitting energy between said associated constant current alternating current circuit and said direct current circuit, the other of said two circuits including a transformer connected to the associated monocyclic network and having Y-connected secondary windings connected to an electric valve means for transmitting energy between said associated constant current alternating current circuit and said direct current circuit.

5. In combination, a constant voltage alternating current circuit, a second constant voltage alternating current circuit, a constant current direct current circuit for transmitting energy between said circuits, and a plurality of circuits interposed between said direct current circuit and each of said constant voltage alternating current circuits each of said circuits comprising a constant current alternating current circuit, means for transmitting energy between the associated constant current alternating current circuit and the associated constant voltage alternating current circuit and an electric valve means for transmitting energy between the associated constant current alternating current circuit and the direct current circuit.

6. In combination, a constant voltage alternating current circuit, a second constant voltage alternating current circuit, a constant current direct current transmission circuit, a plurality of circuits interposed between said first mentioned constant voltage circuit and said direct current circuit each comprising a constant current alternating current circuit, means for transmitting energy between said associated constant voltage circuit and said constant current circuit including a monocyclic network, means for effecting a predetermined electrical phase displacement between the phase currents of said constant current alternating current circuit and the respective phase currents of the other constant current circuits of said plurality of circuits and electric valve means interposed between said associated constant current alternating current circuit and said direct current circuit for converting alternating current of constant value to direct current of constant value, and a plurality of circuits interposed between said direct current circuit and said second constant voltage circuit each comprising an electric valve means for inverting direct current of constant value to alternating current of constant value, a constant current alternating current circuit and means for transforming alternating current of constant value to constant voltage alternating current including a monocyclic network interposed between said associated constant current alternating current circuit and said second constant voltage circuit.

BURNICE D. BEDFORD.
CLODIUS H. WILLIS.
FRANK R. ELDER.